United States Patent
Barnavol

Patent Number: 5,378,097
Date of Patent: Jan. 3, 1995

[54] SHEET METAL NUT FOR BLIND FASTENING

[75] Inventor: Charles Barnavol, Grenoble, France

[73] Assignee: A. Raymond & CIE, Grenoble-Cedex, France

[21] Appl. No.: 136,206

[22] Filed: Oct. 15, 1993

[30] Foreign Application Priority Data

Oct. 15, 1992 [DE] Germany .............. 4234778

[51] Int. Cl.⁶ .............. F16B 13/04; F16B 37/04
[52] U.S. Cl. .............. 411/38; 411/55; 411/183
[58] Field of Search .............. 411/34, 37, 38, 55, 411/182, 183

[56] References Cited

U.S. PATENT DOCUMENTS

| | | | |
|---|---|---|---|
| 2,017,421 | 10/1935 | Post | 411/38 |
| 2,184,783 | 12/1939 | Tinnerman | 411/34 |
| 2,396,501 | 3/1946 | Gibson | 411/38 |
| 4,657,456 | 4/1987 | Anquetin | 411/38 |

FOREIGN PATENT DOCUMENTS

| | | |
|---|---|---|
| 438011 | 11/1935 | United Kingdom . |
| 1537265 | 12/1978 | United Kingdom ........ 411/34 |
| 2185081 | 7/1987 | United Kingdom ........ 411/34 |

Primary Examiner—Neill R. Wilson
Attorney, Agent, or Firm—Finnegan, Henderson, Farabow, Garrett & Dunner

[57] ABSTRACT

A sheet-metal nut for blind fastening a screw in a hole of a carrier plate, the nut having a top plate bearing on an upper surface of the carrier plate having a hole therein and an aperture for the passage of the screw, a base plate having a threaded portion adapted to be inserted into the hole in the carrier plate located at a distance from the top plate and a plurality of connecting webs connecting the base plate to the top plate that fold outwardly in use. The nut is formed from a single piece of sheet metal, the connecting webs being integrally connected at one end to opposite sides of the base plate and at the other end to two top plate halves that lie adjacent each other in the same plane and form the top plate.

4 Claims, 1 Drawing Sheet

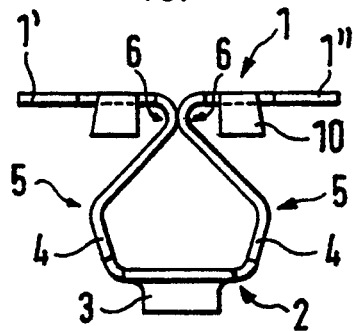
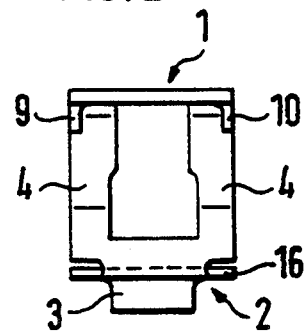
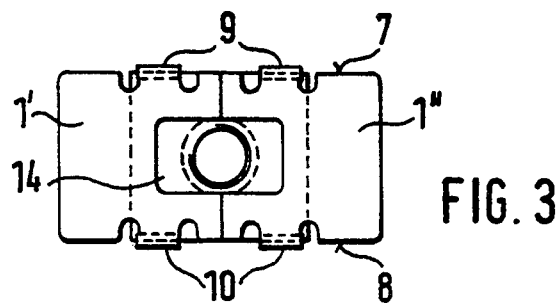
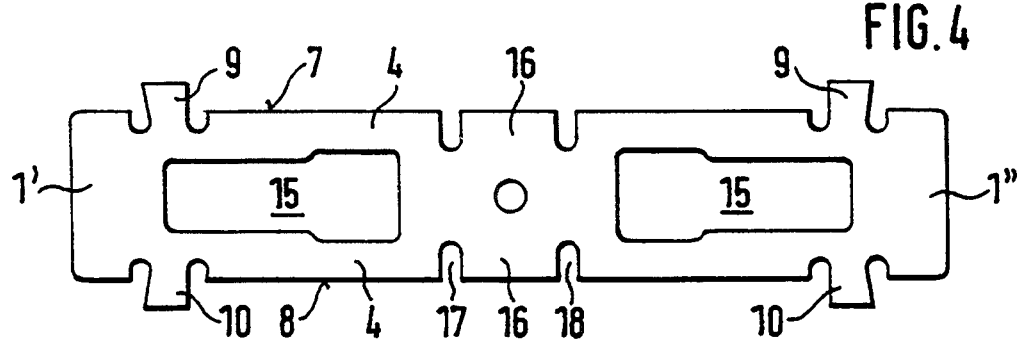
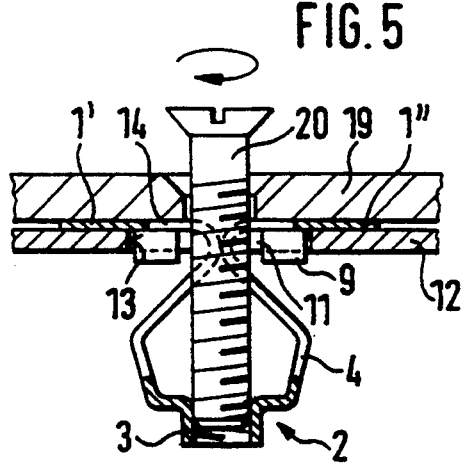
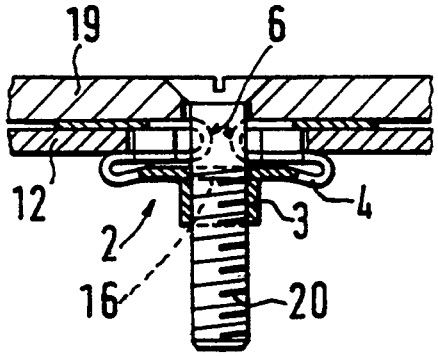

SHEET METAL NUT FOR BLIND FASTENING

BACKGROUND OF THE INVENTION

This invention relates to a sheet-metal nut for blind fastening a screw in a hole in a carrier plate. The sheet-metal nut includes a top plate that bears against the front side of the carrier plate adjacent a hole in the carrier plate and having a cutout for the passage of a screw and a threaded sleeve spaced from the top plate that is connected to the top plate by connecting webs that fold outwardly when a screw is threaded into the sleeve.

Sheet-metal nuts of this type have the advantage that, after inserting the threaded sleeve into the hole in the carrier plate, the connecting webs, when the screw is screwed into the sleeve pulling it towards the carrier plate, fold outwardly and are brought to bear firmly against the rear side of the carrier plate adjacent the edge of the hole. The sheet-metal nut is thus anchored securely in the carrier plate with a large retaining force.

British patent No. 438,011 discloses a sheet-metal nut of this type, in which the top plate having connecting webs projecting from six sides is punched out of a single blank. The connecting webs are bent over, approximately at right angles and, at their ends, are connected to a separate nut which is provided with a peripheral groove to receive the ends of the webs. Owing to the ray-like arrangement of the connecting webs, the sheet-metal nut requires, for its production, a relatively wide strip of sheet-metal and there is also a comparatively large amount of waste after the nut has been punched from it. Moreover, since a special, non-standard nut is used, which nut has to be mounted in a special procedure, the known sheet-metal nut is very expensive to manufacture as a mass-produced item.

The object of the invention therefore is to design a sheet-metal nut that can be shaped in a substantially simpler manner, without impairing its retaining force, and is also cheaper to produce.

SUMMARY OF THE INVENTION

This object is achieved according to the invention by providing a sheet-metal nut for blind fastening a threaded member in a hole in a carrier plate formed from a single, rectangular piece of sheet metal comprising a top plate formed of two plate halves and adapted to bear against a front side of the carrier plate, said top plate halves lying in the same plane and each having an inner end adjacent each other, an aperture in said top plate located between said inner ends of the two plate halves for passage of the threaded member, a base plate extending parallel to and spaced from said top plate having a threaded portion aligned with said aperture for receiving the threaded member and two pairs of bendable connecting webs integrally connected between said base plate and said top plate, a first pair integrally connected at one end to a first side of the base plate and at the other end to an inner end of one of the two top plate halves and a second pair integrally connected at one end to an opposite side of the base plate and at the other end to an inner end of the other one of the two top plate halves, whereby when the base plate of the nut is inserted into the hole in the carrier plate, and the threaded member is inserted into the aperture in the top plate and threaded into the threaded portion of the base plate, the base plate will be drawn towards the top plate, the connecting webs folding outwardly and being brought to bear against a rear side of the carrier plate.

Consequently, the entire sheet-metal nut can be manufactured in one piece from a comparatively narrow strip of sheet-metal which leads to a considerable reduction in its production costs.

BRIEF DESCRIPTION OF THE DRAWINGS

An exemplary embodiment of the invention, which is explained in more detail below, is shown in the drawings, in which:

FIG. 1 is a side view of the sheet-metal nut of the invention;

FIG. 2 is a front view of the sheet-metal nut;

FIG. 3 is plan view of the sheet-metal nut;

FIG. 4 shows an elongated blank used for making the sheet-metal nut that has been punched from a strip of sheet-metal before forming the nut;

FIG. 5 shows the sheet-metal nut after it has been formed and inserted into a hole in a carrier plate with a fastening screw in place; and FIG. 6 shows the sheet-metal nut after the screw has been screwed in.

DETAILED DESCRIPTION OF THE INVENTION

The sheet-metal nut shown in the drawings is used for blind fastening a screw in a hole in a carrier plate and is readily manufactured from a continuous strip of sheet-metal.

In its bent form, as shown in FIGS. 1–3, the sheet-metal nut consists of a top plate 1 and a base plate 2 containing an integral tapped or threaded sleeve portion 3, which base plate is connected to the top plate, at a distance therefrom, by a plurality of connecting webs 4 that can be folded outwardly. As shown, top plate 1 is made up of two top plate halves 1' and 1" which, as best shown in FIG. 4, are integrally connected to the ends of connecting webs 4, opposite from base plate 2.

After the blank has been punched out of a strip of sheet-metal as shown in FIG. 4, the two top-plate halves 1' and 1" are brought together by first bending connecting webs 4 upwardly, towards each other, at an angle less than 90°, for example 75°–80°. Each pair of connecting webs 4 are then bent over obliquely at bending points 5 (FIG. 1) towards each other until they make contact at a second bending point 6. Top plate halves 1' and 1" at the same time are then bent over in opposite directions so that they lie adjacent each other in the same plane and are parallel to base plate 2.

On both top plate halves 1' and 1" are integral lugs 9 and 10, which project laterally from both sides of the longitudinal edges 7 and 8 of the punched blank, which lugs are bent downwards toward base plate 2 and the tapped sleeve 3. In use, lugs 9 and 10 penetrate down into the corners of the hole 11 in a carrier plate 12, the divided top plate of the sheet metal nut thus being supported by and prevented from turning in the hole in the carrier plate by the lugs.

As shown in FIG. 4, connecting webs 4 are formed by punching out spaces 15 in the middle of the blank, the end portions of the spaces forming, when connecting webs 4 have been brought together as described above and as best shown in FIG. 3, an aperture 14 for the passage of a fastening screw 20.

Between base plate 2 and connecting webs 4, are slots 17 and 18 that are punched out of the blank from the side. These slots form supporting lugs 16 which project transversely between the slots 17 and 18 and, when the tapped sleeve 3 has been pulled up against the carrier plate as shown in FIG. 6, will bear against the bent ends of the connecting webs 4.

Use of the sheet-metal nut is shown in FIGS. 5 and 6. In FIG. 5, the sheet-metal nut has been inserted into a hole 11 in a carrier plate 12. Also shown is a flat plate 19 that has been placed on top of top plate 1 of the sheet-metal nut and that is to be fastened to the carrier plate 12 by the screw 20.

FIG. 6 shows the nut after screw 20 has been screwed in, the connecting webs 4 now being folded outwardly and drawn up against the back side of plate 12, while the supporting lugs 16 of tapped sleeve 3 bear firmly against the webs at their bending points 6. This results in a firm anchoring of the nut in the carrier plate.

Alternatively, in place of tapped sleeve 3, a pretapped boss for sheet-metal screws may be provided in base plate 2.

What is claimed is:

1. A sheet-metal nut for blind fastening a threaded member in a hole in a carrier plate formed from a single, rectangular piece of sheet metal comprising a top plate formed of two plate halves and adapted to bear against a front side of the carrier plate, said top plate halves lying in the same plane and each having an inner end adjacent each other, an aperture in said top plate located between said inner ends of the two plate halves for passage of the threaded member, a base plate extending parallel to and spaced from said top plate having a threaded portion aligned with said aperture for receiving the threaded member and two pairs of bendable, connecting webs integrally connected between said base plate and said top plate, a first pair integrally connected at one end to a first side of the base plate and at the other end to an inner end of one of said two top plate halves and a second pair integrally connected at one end to an opposite side of the base plate and at the other end to an inner end of the other one of said two top plate halves, whereby when the base plate of the nut is inserted into the hole in the carrier plate, and the threaded member is inserted into the aperture in the top plate and threaded into the threaded portion of the base plate, the base plate will be drawn towards the top plate, the connecting webs folding outwardly and being brought to bear against a rear side of the carrier plate, said sheet-metal nut having a plurality of lugs extending perpendicularly from the sides of the top plate halves toward said base plate that are adapted to fit in the hole in the carrier plate when the nut is inserted into the hole to prevent the nut from turning in the hole when the threaded member is threaded into the threaded portion of the base plate.

2. The sheet-metal nut of claim 1, including a supporting lug on said base plate that is brought to bear against each pair of folded connecting webs when said webs bear against the rear side of the carrier plate.

3. A sheet-metal nut for blind fastening a threaded member in a hole in a carrier plate formed from a single, rectangular piece of sheet metal comprising a top plate formed of two plate halves and adapted to bear against a front side of them carrier plate, said top plate halves lying in the same plane and each having an inner end adjacent each other, an aperture in said top plate located between said inner ends of the two plate halves for passage of the threaded member, a base plate extending parallel to and spaced from said top plate having a threaded portion aligned with said aperture for receiving the threaded member and two pairs of bendable, connecting webs integrally connected between said base plate and said top plate, a first pair integrally connected at one end to a first side of the base plate and at the other end to an inner end of one of said two top plate halves and a second pair integrally connected at one end to an opposite side of the base plate and at the other end to an inner end of the other one of said two top plate halves, said webs of each pair being spaced apart to provide an open space between them that extends into each top plate halve and together form the aperture in the top plate for the threaded member, whereby when the base plate of the nut is inserted into the hole in the carrier plate, and the threaded member is inserted into the aperture in the top plate and threaded into the threaded portion of the base plate, the base plate will be drawn towards the top plate, the connecting webs folding outwardly and being brought to bear against a rear side of the carrier plate.

4. The sheet-metal nut of claim 3, including a supporting lug on said base plate that is brought to bear against each pair of folded connecting webs when said webs bear against the rear side of the carrier plate.

* * * * *